May 26, 1931.  J. G. BLUNT  1,807,334
LOCOMOTIVE STRUCTURE
Filed March 1, 1930   2 Sheets-Sheet 1
-FIG.1.-
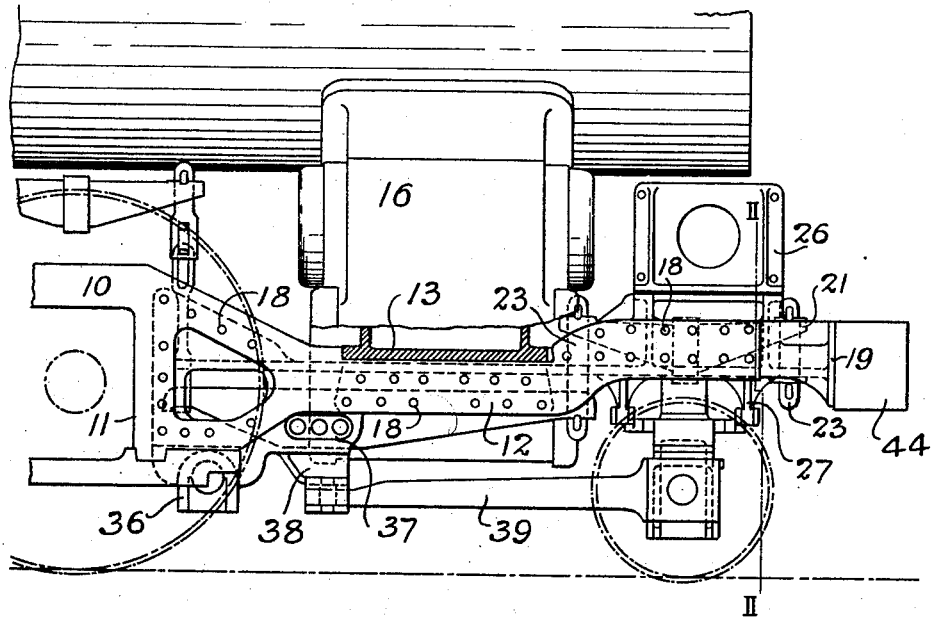
-FIG.2.-
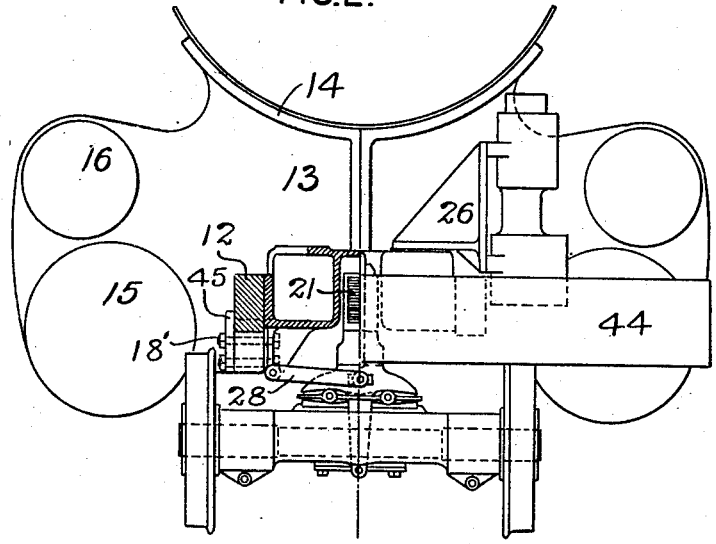
INVENTOR
*James G. Blunt.*
BY *S. O. Yeaton*
ATTORNEY May 26, 1931. J. G. BLUNT 1,807,334
LOCOMOTIVE STRUCTURE
Filed March 1, 1930  2 Sheets-Sheet 2
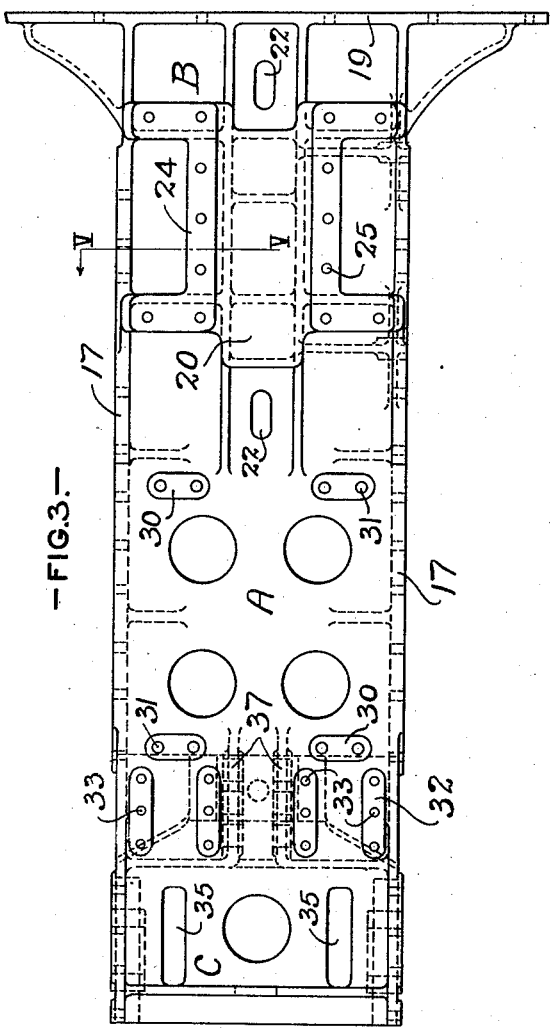
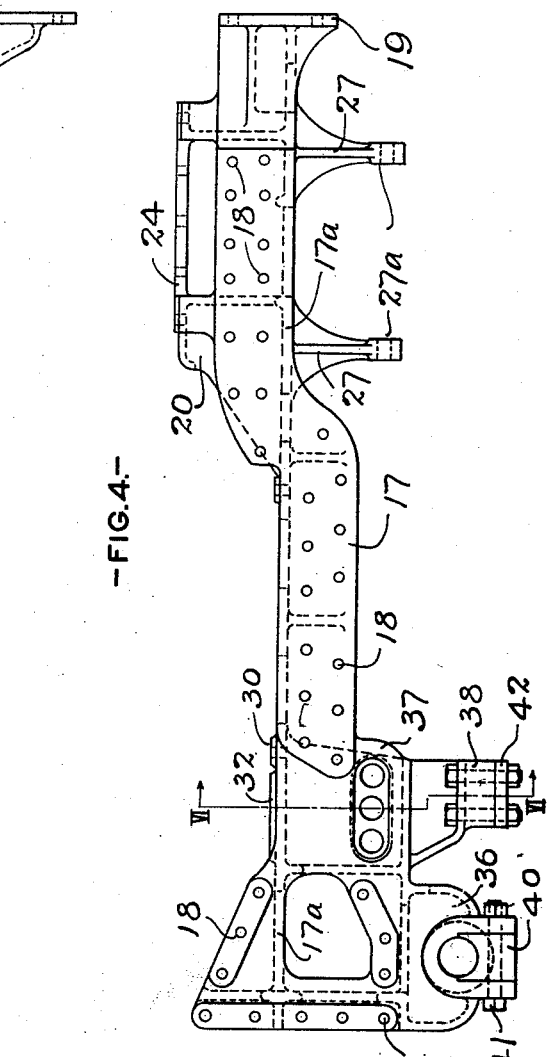
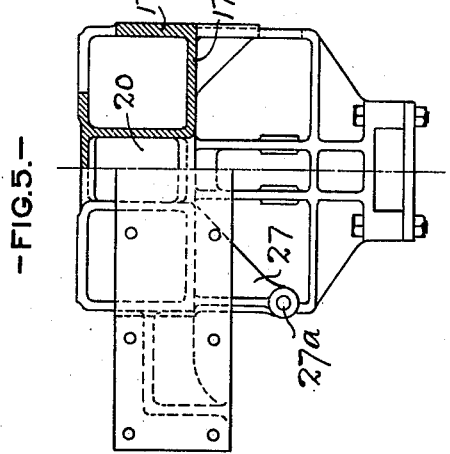
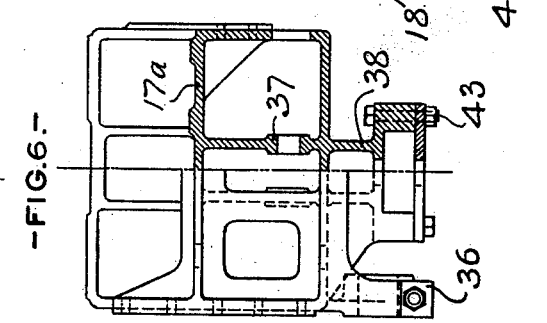
INVENTOR
BY *James G. Blunt.*
*S. C. Yeaton*
ATTORNEY Patented May 26, 1931

1,807,334

UNITED STATES PATENT OFFICE

JAMES G. BLUNT, OF SCHENECTADY, NEW YORK

LOCOMOTIVE STRUCTURE

Application filed March 1, 1930. Serial No. 432,386.

This invention relates to improvements in locomotive structures, and more particularly to a novel combination of side front frame members, cylinders, valve chests, cylinder saddle, frame cross-tie, bumper beam bracket, air pump bracket supports, lateral motion device link brackets, truck spring pocket, truck spring hanger slots, cylinder saddle supports, brake cylinder supports, brake shaft bearings, brake lever slots, equalizer lever fulcrum bracket, and truck radius bar pivot bracket.

An object of the invention is to provide a structure of the type indicated, which is more economical to manufacture, assemble and maintain, which is more compact, and which possesses greater strength and durability than the structures heretofore known.

Another object of the invention is to provide a combined cross-tie and apparatus supporting structure, which may be fabricated of separate parts or formed as an integral or one piece casting.

Other objects of the invention will hereinafter readily appear.

The improvement claimed is hereinafter fully set forth.

In the accompanying drawings: Figure 1, is a side view in elevation of the forward end of a locomotive embodying the invention, a portion of the right hand cylinder being broken away; Fig. 2, a view of the construction shown in Fig. 1, the right hand half being in front elevation, and the left hand half in transverse vertical section on the line II—II of Fig. 1; Fig. 3, a top plan view of the combined cross-tie and apparatus supporting structure; Fig. 4, a side elevation thereof; Fig. 5, a view of the construction shown in Fig. 3, the left hand half being in front elevation, and the right hand half in transverse vertical section on the line V—V of Fig. 3; and, Fig. 6, a view of the construction shown in Fig. 3, the left hand half being in rear elevation, and the right hand half in transverse vertical section on the line VI—VI of Fig. 4.

In the practice of the invention, referring descriptively to the specific embodiment thereof which has been selected for exemplification herein, the locomotive structure comprises a pair of side frame members 10, each having a front driving pedestal jaw 11, and a front frame member 12, projecting forwardly of said pedestal jaw to a point considerably in advance of a cylinder saddle 13. The cylinder saddle 13, comprises two half saddles and a boiler fit 14. Integrally formed with each half saddle is a working cylinder 15, and a distribution valve chest 16. It is within the contemplation of the invention, however to use instead of the type of saddle, cylinder, and distribution valve chest construction described, any of the heretofore known types of construction suitable for the purposes of this invention.

A combined cross-tie and apparatus supporting structure which may be fabricated of separate parts or formed as an integral or one piece casting, is interposed between the front frame members 12. This structure comprises an intermediate portion A disposed beneath the cylinder saddle; a front portion B extending forwardly of the cylinder saddle; and a rear portion C extending rearwardly of the cylinder saddle. The structure embodies two vertical longitudinal flanges or side walls 17, each having bolt holes 18, for attachment to the front frame members 12; and a horizontal web 17a, connecting the side walls 17.

The front portion B of the cross-tie structure comprises a traverse vertical wall 19, constituting a bumper bracket; a pocket 20, for the reception of a truck spring 21; slots 22 for the passage of truck spring hangers 23; supports 24 having bolt holes 25 for the attachment of air pump brackets 26; and a pair of downwardly depending brackets 27, each having a bore 27a for the attachment of a lateral motion device link 28.

The intermediate portion A of the cross-tie structure, comprises four bosses 30, each having bolt holes 31, for attachment to the bottom of the cylinder saddle 13.

The rear portion C of the cross-tie structure, comprises two pairs of supports or bosses 32, each having holes 33, for the attachment of a brake cylinder (not shown); two slots 35, for the passage of brake levers (not shown); a pair of brake shaft bearings 36; an equalizer lever fulcrum bracket 37; and a pivot bracket 38 for the rear end of a leading truck radius bar 39.

A cap 40 is secured to each brake shaft bearing 36, by a bolt 41; and a cap plate 42, is secured to the bottom of the radius bar pivot bracket 38, by bolts 43. While a bumper beam 44 has been shown as detachable from the bumper beam bracket 19, it is within the contemplation of the invention to form the bumper beam integrally with the cross-tie structure.

Each cylinder casting is provided with a bolting flange 45, for attachment to the front frame members 12. The bolts 18' at the saddle portion of the structure pass through the side walls 17, of the cross-tie member beneath the cylinder saddles, through the front frame members and through the flanges 45 of the cylinders.

The lateral motion device for the leading truck illustrated in the drawings, is of the type fully described in Patent No. 1,678,321, issued to me July 24, 1928, and accordingly, its details are not described herein.

The described construction is characterized by the following important advantages: It can be economically manufactured; it enables strong durable jointures to be effected between the cylinder and saddle castings, the cross-tie, and the front frame members; it provides adequate bolting area to insure a connection of the cross-tie member to the front frame members capable of withstanding the heavy stresses encountered in service; it eliminates a large number of finishing operations and attaching bolts heretofore required.

The invention claimed and desired to be secured by Letters Patent is:—

1. In a locomotive structure, the combination of a pair of side front frame members; a cylinder saddle disposed intermediate the length thereof; a cross-tie member separate from the cylinder saddle, detachably connected to the front frame members and having a portion disposed beneath the saddle having an upper face upon which the saddle is supported and to which the saddle is detachably connected; a portion extending rearwardly of the saddle, and a portion extending forwardly of the saddle; and a pair of cylinders each connected to the saddle and detachably fastened to one of the front frame members.

2. In a locomotive structure, the combination of a pair of side front frame members; a cylinder saddle disposed intermediate the length thereof; and a cross-tie member detachable from the front frame members and the saddle and having a portion disposed beneath the saddle, a portion extending rearwardly of the saddle, and a portion extending forwardly of the saddle.

3. In a locomotive structure, the combination of a pair of side front frame members; a cylinder saddle disposed intermediate the length thereof; and a cross-tie member detachable from the front frame members and the saddle and having a portion disposed beneath the saddle, a portion extending rearwardly of the saddle, and a portion extending forwardly of the saddle, the said three portions being each bolted to the front frame members, the portion beneath the saddle being detachably fastened thereto.

4. In a locomotive structure, the combination of a pair of side front frame members; a cylinder saddle disposed intermediate the length thereof; a cross-tie member detachably fastened to the front frame members and having a portion disposed beneath the saddle, a portion extending rearwardly of the saddle, and a portion extending forwardly of the saddle, the portion beneath the saddle being detachably fastened thereto; and a pair of cylinders each connected to the saddle and detachably fastened to one of the front frame members.

5. In a locomotive structure, the combination of a pair of side front frame members; a cylinder saddle disposed intermediate the length thereof; and a cross-tie member detachably fastened to the front frame members and having a portion disposed beneath the saddle and detachably connected thereto, a portion disposed rearwardly of the saddle having a truck radius bar pivot bracket, and a portion extending forwardly of the saddle having a bumper beam support.

6. A combined cross-tie and apparatus supporting structure for locomotives, comprising vertical side flanges adapted for attachment to front frame members; a portion adapted to extend beneath a cylinder saddle; a portion extending rearwardly thereof; and a portion adapted to project forwardly thereof and having a lateral motion device bracket.

7. A combined cross-tie and apparatus supporting structure for locomotives, formed as an integral casting, and comprising vertical side flanges adapted for attachment to front frame members; a portion adapted to extend beneath a cylinder saddle; and a portion adapted to project forwardly of the cylinder saddle and having a pocket for a truck spring.

8. A combined cross-tie and apparatus supporting structure for locomotives, comprising vertical side flanges adapted for attachment to front frame members; a portion adapted to extend beneath a cylinder saddle; and a portion adapted to project forwardly of the cylinder saddle and having a pocket for a truck spring and slots for spring hangers.

9. A combined cross-tie and apparatus supporting structure for locomotives, comprising vertical side flanges adapted for attachment to front frame members; a portion adapted to extend beneath a cylinder saddle; and a portion adapted to project forwardly of the cylinder saddle and having a lateral motion device bracket and a pocket for a truck spring.

10. A combined cross-tie and apparatus supporting structure for locomotives, comprising vertical side flanges adapted for attachment to front frame members; a portion adapted to extend beneath a cylinder saddle and having an upper face adapted for supporting the saddle thereupon and for detachably securing the saddle thereto, and a portion adapted to project rearwardly of the cylinder saddle and having a bracket for a truck radius bar pivot.

11. A combined cross-tie and apparatus supporting structure for locomotives, comprising vertical side flanges adapted for attachment to front frame members; a portion adapted to extend beneath a cylinder saddle; and a portion adapted to project rearwardly of the cylinder saddle and having a support for a brake cylinder.

12. A combined cross-tie and apparatus supporting structure for locomotives, comprising vertical side flanges adapted for attachment to front frame members; a portion adapted to extend beneath a cylinder saddle; and a portion adapted to project rearwardly of the cylinder saddle and having a brake shaft bearing.

13. A combined cross-tie and apparatus supporting structure for locomotives, comprising vertical side flanges adapted for attachment to front frame members; a portion adapted to extend beneath the cylinder saddle; and a portion adapted to project rearwardly of the cylinder saddle and having a bracket for a truck radius bar pivot and a support for a brake cylinder.

14. A combined cross-tie and apparatus supporting structure for locomotives, comprising vertical side flanges adapted for attachment to front frame members; a portion adapted to extend beneath the cylinder saddle; and a portion adapted to project rearwardly of the cylinder saddle, having a brake shaft bearing and a support for a brake cylinder.

15. A combined cross-tie and apparatus supporting structure for locomotives, comprising vertical side flanges adapted for attachment to front frame members; a portion adapted to extend beneath the cylinder saddle and having means for attachment thereto; and a portion adapted to project rearwardly of the cylinder saddle having a brake shaft bearing, a support for a brake cylinder, and a bracket for a truck radius bar pivot.

16. A combined cross-tie and apparatus supporting structure for locomotives, comprising vertical side flanges adapted for attachment to front frame members; a portion adapted to extend beneath the cylinder saddle and having means for attachment thereto; a portion adapted to project forwardly of the cylinder saddle; and a portion adapted to project rearwardly of the cylinder saddle, the said forward portion including a truck spring pocket, and the said rear portion including a bracket for a truck radius bar pivot.

17. A combined cross-tie and apparatus supporting structure for locomotives comprising vertical side flanges adapted for attachment to front frame members; a portion adapted to extend beneath a cylinder saddle and having means for attachment thereto; a portion adapted to project rearwardly of the cylinder saddle, having an equalizer lever fulcrum bracket; and a portion adapted to project forwardly of the cylinder saddle, having a bracket for a truck lateral motion device.

18. A combined cross-tie and apparatus supporting structure for locomotives, comprising vertical side flanges adapted for attachment to front frame members; a portion adapted to extend beneath a cylinder saddle and having means for attachment thereto; a portion adapted to project rearwardly of the cylinder saddle, having a radius bar pivot bracket; and a portion adapted to project forwardly of the cylinder saddle, having a truck spring pocket and a bracket for a truck lateral motion device.

19. A combined cross-tie and apparatus supporting structure for locomotives, comprising vertical side flanges adapted for attachment to front frame members; a portion adapted to extend beneath the cylinder saddle and having means for attachment thereto; a portion projecting rearwardly of the cylinder saddle, said rear portion comprising an equalizer lever fulcrum bracket, a bracket for a truck radius bar pivot, a brake shaft bearing, and a support for an air brake cylinder; and a portion projecting forwardly of the cylinder saddle comprising a bumper beam support, a lateral motion device bracket and a truck spring pocket.

JAMES G. BLUNT.